(12) United States Patent
Gokhale

(10) Patent No.: US 8,719,809 B2
(45) Date of Patent: May 6, 2014

(54) POINT IN TIME ROLLBACK AND UN-INSTALLATION OF SOFTWARE

(75) Inventor: Parag Gokhale, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1726 days.

(21) Appl. No.: 11/615,378

(22) Filed: Dec. 22, 2006

(65) Prior Publication Data

US 2008/0155526 A1    Jun. 26, 2008

(51) Int. Cl.
*G06F 9/44* (2006.01)
(52) U.S. Cl.
USPC .......................... 717/170; 717/168; 717/169
(58) Field of Classification Search
None
See application file for complete search history.

(56) References Cited

U.S. PATENT DOCUMENTS

| | | | |
|---|---|---|---|
| 4,686,620 A | 8/1987 | Ng | |
| 4,751,639 A | 6/1988 | Corcoran et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,204,958 A | 4/1993 | Cheng et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,251 A | 7/1994 | Urabe et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,426,284 A | 6/1995 | Doyle | |
| 5,448,724 A | 9/1995 | Hayashi et al. | |
| 5,491,810 A | 2/1996 | Allen | |

(Continued)

FOREIGN PATENT DOCUMENTS

| | | |
|---|---|---|
| EP | 0259 912 | 3/1988 |
| EP | 0 405 926 | 1/1991 |

(Continued)

OTHER PUBLICATIONS

Denis Toma, "Advanced Installer", Mar. 15, 2006, Caphyon Ltd.*

(Continued)

*Primary Examiner* — Lewis A Bullock, Jr.
*Assistant Examiner* — Mark Gooray
(74) *Attorney, Agent, or Firm* — Knobbe, Martens, Olson & Bear, LLP

(57) ABSTRACT

Systems and methods for providing point in time rollback and un-installation of software within computer networks are disclosed. The system comprises a plurality of elements which perform data migration operations and a rollback and un-installation manager which monitors the elements and software installations. Upon detection of a software installation, the rollback and un-installation manager identifies the installation, obtains records of the computer network files modified by the installation, and causes copies of the modified files to be generated. At future dates, the records and copies are utilized to return the computer network to a state prior to the installation. In this manner the risks associated with removal single or multiple updates are greatly reduced.

13 Claims, 4 Drawing Sheets

(56) References Cited

U.S. PATENT DOCUMENTS

| | | |
|---|---|---|
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,559,991 A | 9/1996 | Kanfi |
| 5,574,898 A | 11/1996 | Leblang et al. |
| 5,613,134 A | 3/1997 | Lucus et al. |
| 5,619,644 A | 4/1997 | Crockett et al. |
| 5,638,509 A | 6/1997 | Dunphy et al. |
| 5,642,496 A | 6/1997 | Kanfi |
| 5,649,185 A | 7/1997 | Antognini et al. |
| 5,673,381 A | 9/1997 | Huai et al. |
| 5,699,361 A | 12/1997 | Ding et al. |
| 5,729,743 A | 3/1998 | Squibb |
| 5,734,817 A | 3/1998 | Roffe et al. |
| 5,737,747 A | 4/1998 | Vishlitzky et al. |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,395 A | 7/1998 | Whiting et al. |
| 5,806,058 A | 9/1998 | Mori et al. |
| 5,812,398 A | 9/1998 | Nielsen |
| 5,812,748 A | 9/1998 | Ohran et al. |
| 5,813,009 A | 9/1998 | Johnson et al. |
| 5,813,013 A | 9/1998 | Shakib et al. |
| 5,813,017 A | 9/1998 | Morris |
| 5,829,046 A | 10/1998 | Tzelnic et al. |
| 5,845,257 A | 12/1998 | Fu et al. |
| 5,860,073 A | 1/1999 | Ferrel et al. |
| 5,864,871 A | 1/1999 | Kitain et al. |
| 5,875,478 A | 2/1999 | Blumenau |
| 5,875,481 A | 2/1999 | Ashton et al. |
| 5,884,067 A | 3/1999 | Storm et al. |
| 5,887,134 A | 3/1999 | Ebrahim |
| 5,896,531 A | 4/1999 | Curtis et al. |
| 5,897,642 A | 4/1999 | Capossela et al. |
| 5,901,327 A | 5/1999 | Ofek |
| 5,924,102 A | 7/1999 | Perks |
| 5,926,836 A | 7/1999 | Blumenau |
| 5,950,205 A | 9/1999 | Aviani, Jr. |
| 5,956,733 A | 9/1999 | Nakano et al. |
| 5,958,005 A | 9/1999 | Thorne et al. |
| 5,974,563 A | 10/1999 | Beeler, Jr. |
| 6,018,744 A | 1/2000 | Mamiya et al. |
| 6,021,415 A | 2/2000 | Cannon et al. |
| 6,026,414 A | 2/2000 | Anglin |
| 6,026,437 A | 2/2000 | Muschett et al. |
| 6,052,735 A | 4/2000 | Ulrich et al. |
| 6,076,148 A | 6/2000 | Kedem et al. |
| 6,078,934 A | 6/2000 | Lahey et al. |
| 6,088,694 A | 7/2000 | Burns et al. |
| 6,091,518 A | 7/2000 | Anabuki |
| 6,094,416 A | 7/2000 | Ying |
| 6,108,712 A | 8/2000 | Hayes, Jr. |
| 6,112,239 A | 8/2000 | Kenner et al. |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,230,164 B1 | 5/2001 | Rekieta et al. |
| 6,249,795 B1 | 6/2001 | Douglis |
| 6,253,217 B1 | 6/2001 | Dourish et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,295,541 B1 | 9/2001 | Bodnar et al. |
| 6,301,592 B1 | 10/2001 | Aoyama et al. |
| 6,304,880 B1 | 10/2001 | Kishi |
| 6,314,439 B1 | 11/2001 | Bates et al. |
| 6,314,460 B1 | 11/2001 | Knight et al. |
| 6,324,581 B1 | 11/2001 | Xu et al. |
| 6,328,766 B1 | 12/2001 | Long |
| 6,330,570 B1 | 12/2001 | Crighton et al. |
| 6,330,572 B1 | 12/2001 | Sitka |
| 6,330,642 B1 | 12/2001 | Carteau |
| 6,343,287 B1 | 1/2002 | Kumar et al. |
| 6,343,324 B1 | 1/2002 | Hubis et al. |
| 6,350,199 B1 | 2/2002 | Williams et al. |
| RE37,601 E | 3/2002 | Eastridge et al. |
| 6,356,801 B1 | 3/2002 | Goodman et al. |
| 6,360,306 B1 | 3/2002 | Bergsten |
| 6,367,029 B1 | 4/2002 | Mayhead et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,453,325 B1 | 9/2002 | Cabrera et al. |
| 6,466,592 B1 | 10/2002 | Chapman |
| 6,470,332 B1 | 10/2002 | Weschler |
| 6,473,794 B1 | 10/2002 | Guheen et al. |
| 6,487,561 B1 | 11/2002 | Ofek et al. |
| 6,493,811 B1 | 12/2002 | Blades et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,593,656 B2 | 7/2003 | Ahn et al. |
| 6,647,396 B2 | 11/2003 | Parnell et al. |
| 6,647,409 B1 | 11/2003 | Sherman et al. |
| 6,658,436 B2 | 12/2003 | Oshinsy et al. |
| 6,658,526 B2 | 12/2003 | Nguyen et al. |
| 6,704,933 B1 | 3/2004 | Tanaka et al. |
| 6,721,767 B2 | 4/2004 | De Meno et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,871,163 B2 | 3/2005 | Hiller et al. |
| 6,952,758 B2 | 10/2005 | Chron et al. |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,039,860 B1 | 5/2006 | Gautestad |
| 7,062,761 B2 | 6/2006 | Slavin et al. |
| 7,103,731 B2 | 9/2006 | Gibble et al. |
| 7,103,740 B1 | 9/2006 | Colgrove et al. |
| 7,107,395 B1 | 9/2006 | Ofek et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,162,496 B2 | 1/2007 | Amarendran et al. |
| 7,174,312 B2 | 2/2007 | Harper et al. |
| 7,174,433 B2 | 2/2007 | Kottomtharayil et al. |
| 7,209,972 B1 | 4/2007 | Ignatius et al. |
| 7,246,140 B2 | 7/2007 | Therrien et al. |
| 7,246,207 B2 | 7/2007 | Kottomtharayil et al. |
| 7,269,612 B2 | 9/2007 | Devarakonda et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,315,923 B2 | 1/2008 | Retnamma et al. |
| 7,315,924 B2 | 1/2008 | Prahlad et al. |
| 7,359,917 B2 | 4/2008 | Winter et al. |

(56) References Cited

U.S. PATENT DOCUMENTS

| | | | |
|---|---|---|---|
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,467,167 B2 | 12/2008 | Patterson | |
| 7,472,238 B1 | 12/2008 | Gokhale | |
| 7,484,054 B2 | 1/2009 | Kottomtharayil et al. | |
| 7,490,207 B2 | 2/2009 | Amarendran | |
| 7,500,053 B1 | 3/2009 | Kavuri et al. | |
| 7,500,150 B2 | 3/2009 | Sharma et al. | |
| 7,529,748 B2 | 5/2009 | Wen et al. | |
| 7,536,291 B1 | 5/2009 | Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,627,598 B1 | 12/2009 | Burke | |
| 7,627,617 B2 | 12/2009 | Kavuri et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,735,078 B1 * | 6/2010 | Vaidya | 717/171 |
| 7,747,579 B2 | 6/2010 | Prahlad et al. | |
| 7,802,067 B2 | 9/2010 | Prahlad et al. | |
| 2002/0004883 A1 | 1/2002 | Nguyen et al. | |
| 2002/0049778 A1 | 4/2002 | Bell et al. | |
| 2002/0107877 A1 | 8/2002 | Whiting et al. | |
| 2003/0033308 A1 | 2/2003 | Patel et al. | |
| 2003/0061491 A1 | 3/2003 | Jaskiewicz et al. | |
| 2003/0163399 A1 | 8/2003 | Harper et al. | |
| 2003/0172158 A1 | 9/2003 | Pillai et al. | |
| 2004/0107199 A1 | 6/2004 | Dairymple et al. | |
| 2004/0193953 A1 | 9/2004 | Callahan et al. | |
| 2004/0225834 A1 | 11/2004 | Lu et al. | |
| 2004/0230829 A1 | 11/2004 | Dogan et al. | |
| 2005/0033755 A1 | 2/2005 | Gokhale et al. | |
| 2005/0033756 A1 | 2/2005 | Kottomtharayil et al. | |
| 2005/0033800 A1 | 2/2005 | Kavuri et al. | |
| 2005/0086443 A1 | 4/2005 | Mizuno et al. | |
| 2005/0131900 A1 | 6/2005 | Palliyll et al. | |
| 2005/0246398 A1 * | 11/2005 | Barzilai et al. | 707/204 |
| 2005/0268068 A1 | 12/2005 | Ignatius et al. | |
| 2006/0005048 A1 | 1/2006 | Osaki et al. | |
| 2006/0010227 A1 | 1/2006 | Atluri | |
| 2006/0224852 A1 | 10/2006 | Kottomtharayil et al. | |
| 2006/0242489 A1 | 10/2006 | Brockway et al. | |
| 2007/0078913 A1 | 4/2007 | Crescenti et al. | |
| 2007/0130430 A1 | 6/2007 | Devassy et al. | |
| 2007/0136381 A1 * | 6/2007 | Cannon et al. | 707/200 |
| 2007/0179995 A1 | 8/2007 | Prahlad et al. | |
| 2007/0183224 A1 | 8/2007 | Erofeev | |
| 2007/0186042 A1 | 8/2007 | Kottomtharayil et al. | |
| 2007/0186068 A1 | 8/2007 | Agrawal | |
| 2007/0192360 A1 | 8/2007 | Prahlad et al. | |
| 2007/0192385 A1 | 8/2007 | Prahlad et al. | |
| 2007/0198612 A1 | 8/2007 | Prahlad et al. | |
| 2007/0288536 A1 | 12/2007 | Sen et al. | |
| 2008/0016027 A1 | 1/2008 | Prahlad et al. | |
| 2008/0016126 A1 | 1/2008 | Kottomtharayil et al. | |
| 2008/0059515 A1 | 3/2008 | Fulton | |
| 2008/0155526 A1 | 6/2008 | Gokhale | |
| 2008/0201343 A1 | 8/2008 | Crescenti et al. | |
| 2008/0209147 A1 | 8/2008 | Kottomtharayil et al. | |
| 2008/0229037 A1 | 9/2008 | Bunte et al. | |
| 2008/0243879 A1 | 10/2008 | Gokhale et al. | |
| 2008/0243914 A1 | 10/2008 | Prahlad et al. | |
| 2008/0243957 A1 | 10/2008 | Prahlad et al. | |
| 2008/0243958 A1 | 10/2008 | Prahlad et al. | |
| 2008/0256173 A1 | 10/2008 | Ignatius et al. | |
| 2008/0276055 A1 | 11/2008 | Devassy et al. | |
| 2009/0043830 A1 | 2/2009 | Lu et al. | |
| 2009/0055407 A1 | 2/2009 | Oshinsky et al. | |
| 2009/0077317 A1 | 3/2009 | Kavuri et al. | |
| 2009/0157881 A1 | 6/2009 | Kavuri et al. | |
| 2009/0164853 A1 | 6/2009 | Gokhale et al. | |
| 2009/0187711 A1 | 7/2009 | Amarendran et al. | |
| 2009/0192979 A1 | 7/2009 | Lunde et al. | |
| 2009/0193113 A1 | 7/2009 | Lunde | |
| 2009/0228894 A1 | 9/2009 | Gokhale | |
| 2009/0248762 A1 | 10/2009 | Prahlad et al. | |
| 2009/0271791 A1 | 10/2009 | Gokhale | |
| 2009/0319585 A1 | 12/2009 | Gokhale | |
| 2010/0017184 A1 | 1/2010 | Retnamma et al. | |
| 2010/0049753 A1 | 2/2010 | Prahlad et al. | |

FOREIGN PATENT DOCUMENTS

| | | |
|---|---|---|
| EP | 0 467 546 | 1/1992 |
| EP | 0 599 466 | 6/1994 |
| EP | 0 774 715 | 5/1997 |
| EP | 0 809 184 | 11/1997 |
| EP | 0 899 662 | 3/1999 |
| EP | 0 981 090 | 2/2000 |
| EP | 0 986 011 | 3/2000 |
| JP | H11-102314 | 4/1999 |
| JP | H11-259459 | 9/1999 |
| JP | 2001-60175 | 3/2001 |
| WO | WO 94/17474 | 8/1994 |
| WO | WO 95/13580 | 5/1995 |
| WO | WO 99/12098 | 3/1999 |
| WO | WO 99/23585 | 5/1999 |

OTHER PUBLICATIONS

U.S. Appl. No. 12/145,347, filed Jun. 24, 2008, Gokhale.
U.S. Appl. No. 12/167,933, filed Jul. 3, 2008, Gokhale.
U.S. Appl. No. 12/695,203, filed Jan. 28, 2010, Prahlad et al.
U.S. Appl. No. 12/695,289, filed Jan. 28, 2010, Prahlad et al.
Armstead et al., "Implementation of a Campus-wide Distributed Mass Storage Service: The Dream vs. Reality," IEEE, 1995, pp. 190-199.
Arneson, "Mass Storage Archiving in Network Environments" IEEE, 1998, pp. 45-50.
Arneson, "Control Data Corporation, Development of Omniserver"; Mass Storage Systems, 1990, pp. 88-93.
Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.
Cabrera, et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).
http://en.wikipedia.org/wiki/Naive_Bayes_classifier.
International Search Report, PCT Application PCT/US02/17973, Aug. 22, 2002; 3 pages.
Jander, M., "Launching Storage-Area Net," Data Communications, US, McGraw Hill, NY, vol. 27, No. 4 (Mar. 21, 1998), pp. 64-72.
Microsoft, about using Microsoft Excel 2000 files with earlier version Excel, 1985-1999, Microsoft, 2 pages.
PCT International Search Report and Written Opinion for International Application No. PCT/US07/81681, Mail Date Nov. 13, 2009, 8 pages.

(56) References Cited

OTHER PUBLICATIONS

Rosenblum et al., "The Design and Implementation of a Log-Structure File System," Operating Systems Review SIGOPS, vol. 25, No. 5, New York, US, pp. 1-15 (May 1991).

Supplementary European Search Report, European Patent Application No. 02747883, Sep. 15, 2006; 2 pages.

Weatherspoon H. et al., "Silverback: A Global-Scale Archival System," Mar. 2001, pp. 1-15.

* cited by examiner

POINT IN TIME ROLLBACK AND UN-INSTALLATION OF SOFTWARE

BACKGROUND OF THE INVENTION

1. Field of the Invention

The invention relates to removal of computer programs installed within a computer network and, in particular, pertains to a data storage system possessing targeted rollback and un-installation ability.

2. Description of the Related Art

Computer software is often upgraded in response to the needs of users. For example, upgrades may be developed to allow software applications to take advantage of new capabilities provided by new hardware or to provide improved features using existing hardware. Alternatively, software may be developed to remedy problems present in software already installed on computers, such as security vulnerabilities or programming errors ("bugs").

Software upgrades may be made available in several different forms, such as entirely new software packages, software updates, or patches. New software packages are generally installed from scratch and provide substantially all of the files required for operation of the software application. In contrast, software updates and patches, which generally provide enhanced features and/or fix understood problems in the operation of software applications, typically replace selected files of the existing program while retaining others. Many such updates and patches may be installed over the lifetime of a software application.

When software upgrades are installed, however, the user is exposed to a degree of risk. While software developers perform extensive testing to ensure smooth integration of the upgrade with existing computer systems, unforeseen hardware/software configurations and programming errors may still result in mild to severe errors which affect the operation of the software. In the case of severe errors, the problems caused by a software update may outweigh the potential benefit the update provides.

Presently, however, there are limited options available for administrators of computer systems to manage the removal of upgrades throughout the lifetime of their software. Furthermore, those options which are available are generally limited, time consuming, and disruptive. In one example, un-installation programs provided with software may be utilized to remove installed software. However, these un-install programs are often poorly coded, leaving remnants of the software program behind which create further problems. In another example, administrators may create a complete copy of their computer system, allowing them to perform a full system restoration, if an upgrade performs undesirably. This method is time consuming, though, as all the data within the computer system is restored just to remove the small fraction of data associated with the problematic upgrade. In a further example, a user may manually examine the exact modifications performed by a software upgrade. However, this method is also time consuming to perform and subject to human error. The problems associated with any of these methods are also magnified as the number of computer systems under management increases.

These difficulties in removal of installed software illustrate the need for improved systems and methods of software removal which provide greater control over the un-installation process, as well as enhanced ease of use.

SUMMARY OF THE INVENTION

In one aspect, certain embodiments of the present invention provide a method of updating a control system that oversees data retention in a computer system having data retention storage spaces. The method comprises receiving an update with update components to the control system, identifying the components of the control system that oversees data retention in the computer system that are to be updated, copying at least some of the components that are to be updated into the data retention storage spaces within the computer system so that subsequent to the update, the components that are to be updated can be replaced in the control system, and replacing the components of the control system that are to be updated with the updated components in the received update.

In another aspect, the embodiments of the present invention provide a method of restoring data within a computer network containing a control system that oversees data retention. The method comprises providing a plurality of elements, comprising at least one of hardware, software, and firmware components, which perform data retention operations, monitoring the plurality of elements, detecting an update with update components for the computer network, identifying the components of the computer network that are to be updated, storing copies of at least some of the components of the computer network that are to be updated, installing the update components, and replacing the update components in the received update with at least some of the components copied prior to the update so that the control system is substantially returned to its state prior to receiving the update.

In a further aspect, the embodiments of the present invention provide a system for point in time rollback and un-installation within a computer network containing a data storage system. The system comprises a plurality of elements which perform at least data storage operations and a rollback and un-installation manager which communicates with the elements to detect an update received by the computer network. The rollback and un-installation manager identifies the components to be modified by the update. At least a portion of the components to be modified by the update are also stored for future restoration by the data storage system.

In one embodiment of the invention, a method updates a data storage system such that the updated data storage system can be rolled back to a pre-update state, the method comprises: identifying at least some components in a data storage system that are to be updated; copying at least some of the components of the data storage system prior to updating such that at least some of the updated components can be rolled back to a pre-update state; updating the components of the data storage system; receiving a rollback request to roll the data storage system back to a pre-update state; and automatically rolling back the updated components of the storage system to the pre-update state by using copies of the components.

In another embodiment of the invention, a method rolls back a software application to a previous state. The method comprises identifying at least some components in a software application that are to be updated; copying at least some of the components of the software application prior to updating such that at least some of the updated components can be rolled back to a pre-update state; updating the components of the software application; and rolling back the updated components of the software application to a pre-update state by automatically reinstalling copies of the components in response to a rollback request.

In yet another embodiment of the invention, a system for point in time rollback and un-installation of updates within a data storage system comprises a plurality of elements which perform at least data storage operations; and a rollback and un-installation manager that monitors an update received by the data storage system, wherein the rollback and un-installation manager identifies the components to be modified by the update, and wherein at least a portion of the components to be modified by the update are stored for future restoration by the rollback and un-installation manager.

In an additional embodiment of the invention, a rollback and un-installation system comprises: means for identifying at least some components in a software application that are to be updated; means for copying at least some of the components of the software application prior to updating such that at least some of the updated components can be rolled back to a pre-update state; means for updating the components of the software application; and means for rolling back the updated components of the software application to a pre-update state by automatically reinstalling copies of the components in response to a rollback request.

BRIEF DESCRIPTION OF THE DRAWINGS

These and other objects and advantages will become more apparent from the following description taken in conjunction with the accompanying drawings.

DETAILED DESCRIPTION OF THE PREFERRED EMBODIMENT

Embodiments of the present invention relate to systems and methods of software rollback and un-installation in data storage systems for use with a computer network. In one embodiment, the data storage system is a data migration system that comprises combinations of hardware, software, and firmware, as well communications links, necessary for performing data migration operations on electronic data within a computer network. One preferred embodiment of a data migration system is provided in U.S. patent application Ser. No. 11/120,619, entitled "HIERARCHICAL SYSTEMS AND METHODS FOR PROVIDING A UNIFIED VIEW OF STORAGE INFORMATION", which is incorporated herein by reference in its entirety.

Figure 1:
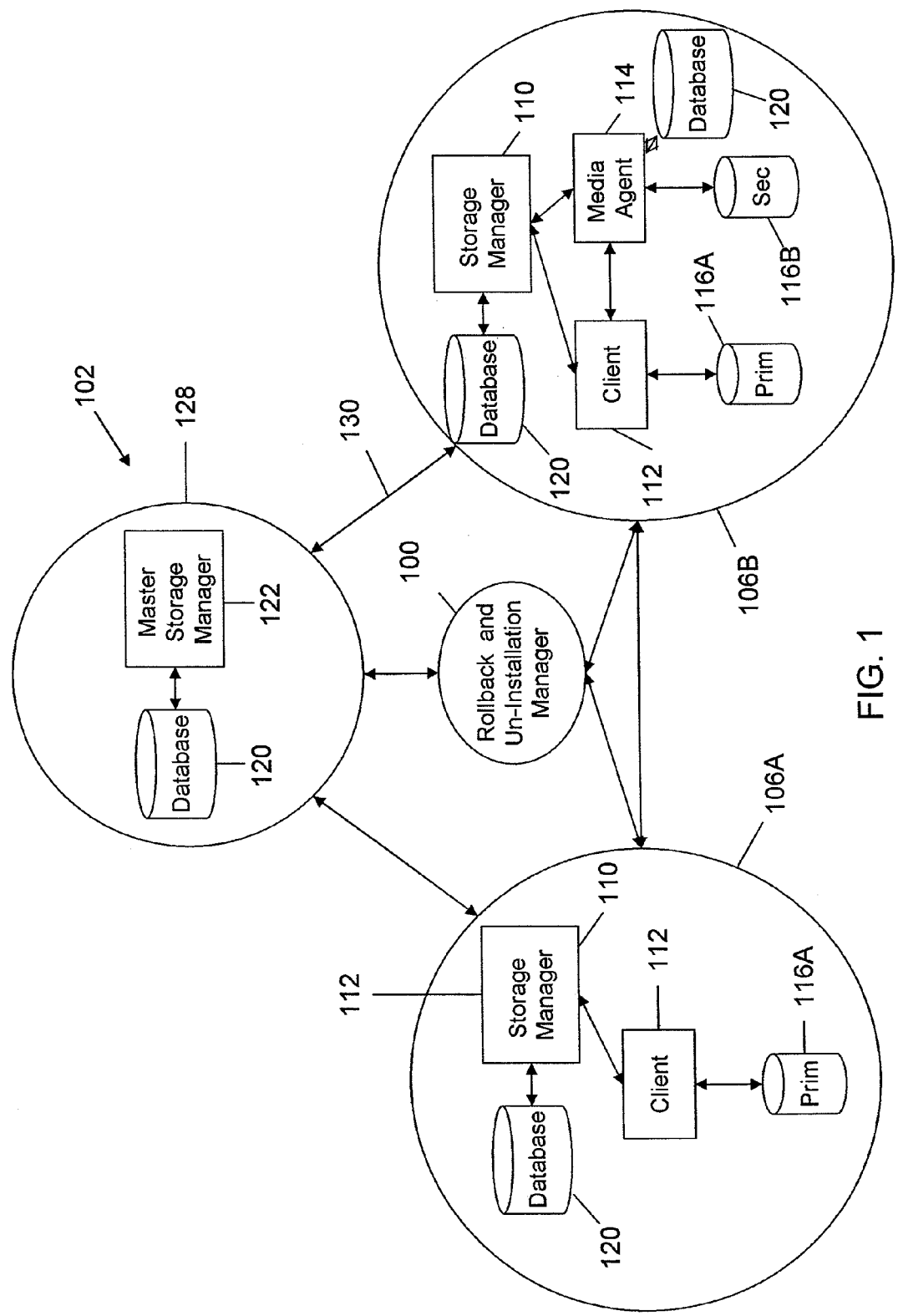
FIG. 1 is a schematic illustration of one embodiment of a data storage system with point in time rollback and un-installation capability.

FIG. 1 illustrates one embodiment of a data storage system such as data migration system 102 possessing point in time rollback and un-installation capability used in conjunction with a computer network. In one embodiment, the system 102 comprises a plurality of storage operation cells such as 106A, B (collectively, 106) and a rollback and un-installation manager 100 which communicate through communication links 130. In general, the rollback and un-installation manager 100 communicates with the cells 106 to monitor when software upgrades are installed within the system 102, for example, when software is installed on a client computer 112 or when the data migration system itself is upgraded. When the rollback and un-installation manager 100 detects installation of the software upgrade, the manager 100 detects and records which files are involved in the installation process, where the files may relate to any hardware, software, or firmware components within the system 102. The rollback and un-installation manager 100 then directs the cells 106 to perform copy operations on the pertinent files. When rollback or un-installation of the installed software upgrades is required, the manager 100 subsequently utilizes these copies and installation records to allow the restoration the system 102 to a selected state of either the computer network or data migration system 102 prior to the software installation. In one embodiment, the manager 100 performs the rollback automatically to a selected state based on the copies and the installation records.

Beneficially, data migration systems 102 equipped with the rollback and un-installation manager 100 substantially diminish the risks of installing software upgrades within the computer network and data migration system 102, reducing the cost of maintaining both. In one aspect, embodiments of the system 102 may automatically obtain information necessary to rollback or un-install software without substantial human intervention prior to installation of upgrades. In this manner, the human labor needed to perform rollback and un-installation operations is reduced.

In further aspects, the system 102 reduces the risks associated with removal of multiple upgrades at one time. As the number of upgrades to be removed from the system 102 or computer network increases, more files are affected by the removal, and the potential for errors in the rollback and un-installation process grows. By obtaining records and stores copies of each affected file prior to each upgrade, however, the state of the system 102 or computer network prior to any upgrade may be restored. Thus, no foresight or additional preparation is necessary for the removal of multiple upgrades.

Additionally, embodiments of the system 102 may restore itself or the computer network to an original state at a selected time, rather than specifying exact updates. Often, problems with an upgrade are not immediately apparent at the time of installation of the upgrade. Further, as updates are often automatically installed, it may not be known which upgrades have been installed. Thus, it may be difficult to determine which installed upgrades may be at fault for detected problems within the system 102 or computer network. The ability of the system 102 to rollback to a selected point in time, however, ensures return to a known good state, without need to understand the exact source of the problem.

One embodiment of the storage operation cells 106 of the system 102 are illustrated in FIG. 1. The storage operation cells 106 may include combinations of hardware, software, and firmware elements associated with performing data migration operations on electronic data, including, but not limited to, creating, storing, retrieving, deleting, and migrating primary data copies and secondary data copies. In non-limiting examples these copies may include snapshot copies, backup copies, hierarchical storage management copies, archive copies, and other types of copies of electronic data. One exemplary storage operation cell 106 may comprise CommCells, as embodied in the QNet storage management system and the QiNetix storage management system by CommVault Systems of Oceanport, N.J.

In one embodiment, the storage operation cells 106 may comprise a plurality of elements such as storage managers 110, client computers 112, media agents 114, and primary and secondary storage devices 116A, B (collectively, 116), as discussed in greater detail below. It may be understood that this list is not exhaustive and that the number of these and other elements present or absent within the cell 106 may be provided as necessary for the data migration operations performed by the cell 106. In some embodiments, certain elements reside and execute on the same computer, while in alternate embodiments, the same or all of the elements reside and execute on different computers.

The storage manager 110 comprises a software module or other application which coordinates and controls data migration operations performed by the storage operation cell 106. These operations may include, but are not limited to, initiation and management of system copying, migrations, and data recovery. To perform these operations, the storage manager 110 may communicate with some or all elements of the storage operation cell 106. The storage manager 110 may also maintain a database 120 or other data structure to indicate logical associations between elements of the cell 106, for example, the logical associations between media agents 114 and storage devices 116 as discussed below.

In one embodiment, the media agent 114 is an element that instructs a plurality of associated storage devices 116 to perform operations which subsequently archive, migrate, or restore data to or from the storage devices 116 as directed by the storage manager 110. For example, the media agent 114 may be implemented as a software module that conveys data, as directed by the storage manager 110, between a client computer 112 and one or more storage devices 116, such as a tape library, a magnetic media storage device, an optical media storage device, or other suitable storage device. In one embodiment, media agents 114 may be communicatively coupled with and control a storage device 116 associated with that particular media agent 114. A media agent 114 may be considered to be associated with a particular storage device 116 if that media agent 114 is capable of routing and storing data to that storage device 116.

In operation, the media agent 114 associated with a particular storage device 116 may instruct the storage device 116 to use a robotic arm or other retrieval mechanism to load or eject certain storage media, and to subsequently archive, migrate, or restore data to or from that media. Media agents 114 may communicate with a storage device 116 via a suitable communications link 130, such as a SCSI or fiber channel communication The media agent 114 may also maintain an index cache, database, or other data structure 120 which stores index data generated during data migration, migration, and restore and other data migration operations that may generate index data. The data structure 120 provides the media agent 114 with a fast and efficient mechanism for locating data stored or archived. Thus, in some embodiments, the storage manager database 120 may store data associating a client 112 with a particular media agent 114 or storage device 116 while database 120 associated with the media agent 114 may indicate specifically where client 112 data is stored in the storage device 116, what specific files are stored, and other information associated with the storage of client 112 data.

In one embodiment, a first storage operation cell 106A may be configured to perform a particular type of data migration operation, such as storage resource management operations (SRM). SRM may comprise operations include monitoring the heath, status, and other information associated with primary copies of data (e.g. live or production line copies). Thus, for example, the storage operation cell 106A may monitor and perform SRM related calculations and operations associated with primary copy data. The first storage operation cell 106A may include a client computer 112 in communication with a primary storage device 116A for storing data directed by the storage manager 110 associated with the cell 106A.

For example, the client 112 may be directed using Microsoft Exchange data, SQL data, oracle data, or other types of production data used in business applications or other applications stored in the primary volume. The storage manager 110 may contain SRM modules or other logic directed to monitor or otherwise interacting with the attributes, characteristics, metrics, and other information associated with the data stored in the primary volume.

In another implementation, a storage operation cell 106B may also contain a media agent 114 and secondary storage volume 116B configured to perform SRM related operations on primary copy data The storage manager 110 may also track and store information associated with primary copy migration. In some embodiments, the storage manager 110 may also track where primary copy information is stored, for example in secondary storage.

In alternative implementations, the storage operation cell 106B may be directed to another type of data migration operation, such as hierarchical storage management (HSM) data migration operations. For example, the HSM storage cell may perform backups, migrations, snapshots or other types of HSM-related operations known in the art. For example, in some embodiments, data is migrated from faster and more expensive storage such as magnetic storage (i.e. primary storage) to less expensive storage such as tape storage (i.e. secondary storage).

The storage manager 110 may further monitor the status of some or all data migration operations previously preformed, currently being performed, or scheduled to be performed by the storage operation cell 106. In one embodiment, the storage manager 110 may monitor the status of all jobs in the storage cells 106 under its control as well as the status of each component of the storage operation cells 106. The storage manager may monitor SRM or HSM operations as discussed above to track information which may include, but is not limited to: file type distribution, file size distribution, distribution of access/modification time, distribution by owner, capacity and asset reporting (by host, disk, or partition), availability of resources, disks, hosts, and applications. Thus, for example, the storage manager 110 may track the amount of available space, congestion, and other similar characteristics of data associated with the primary and secondary volumes 116A, B, and issue appropriate alerts to the reporting manager 100 when a particular resource is unavailable or congested.

The storage manager 110 of a first storage cell 106A may also communicate with a storage manager 110 of another cell, such as 106B. In one example, a storage manager 110 in a first storage cell 106A communicates with a storage manager 110 in a second cell 106B to control the storage manager 110 of the second cell 106B. Alternatively, the storage manager 110 of the first cell 106A may bypass the storage manager 110 of the second cell 106B and directly control the elements of the second cell 106B.

In further embodiments, the storage operation cells 106 may be hierarchically organized such that hierarchically superior cells control or pass information hierarchically to subordinate cells and vice versa. In one embodiment, a master storage manager 122 may be associated with, communicate with, and direct data migration operations for a plurality of storage operation cells 106. In some embodiments, the master storage manager 122 may reside in its own storage operation cell 128. In other embodiments, (not shown), the master storage manager 122 may itself be part of a storage operation cells 106.

In other embodiments, the master storage manager 122 may track the status of its associated storage operation cells 106, such as the status of jobs, system elements, system resources, and other items by communicating with its respect storage operation cells 106. Moreover, the master storage manager 122 may track the status of its associated storage operation cells 106 by receiving periodic status updates from the cells 106 regarding jobs, elements, system resources, and other items. For example, the master storage manager 122 may use methods to monitor network resources such as mapping network pathways and topologies to, among other things, physically monitor the data migration operations.

The master storage manager 122 may contain programming or other logic directed toward analyzing the storage patterns and resources of its associated storage cells 106. Thus, for example, the master storage manager 122 may monitor or otherwise keep track of the amount of resources available such as storage media in a particular group of cells 106. This allows the master storage manager 122 to determine when the level of available storage media, such as magnetic or optical media, fall below a selected level, so that an alert may be issued to the reporting manager 110 that additional media may be added or removed as necessary to maintain a desired level of service.

Figure 2:
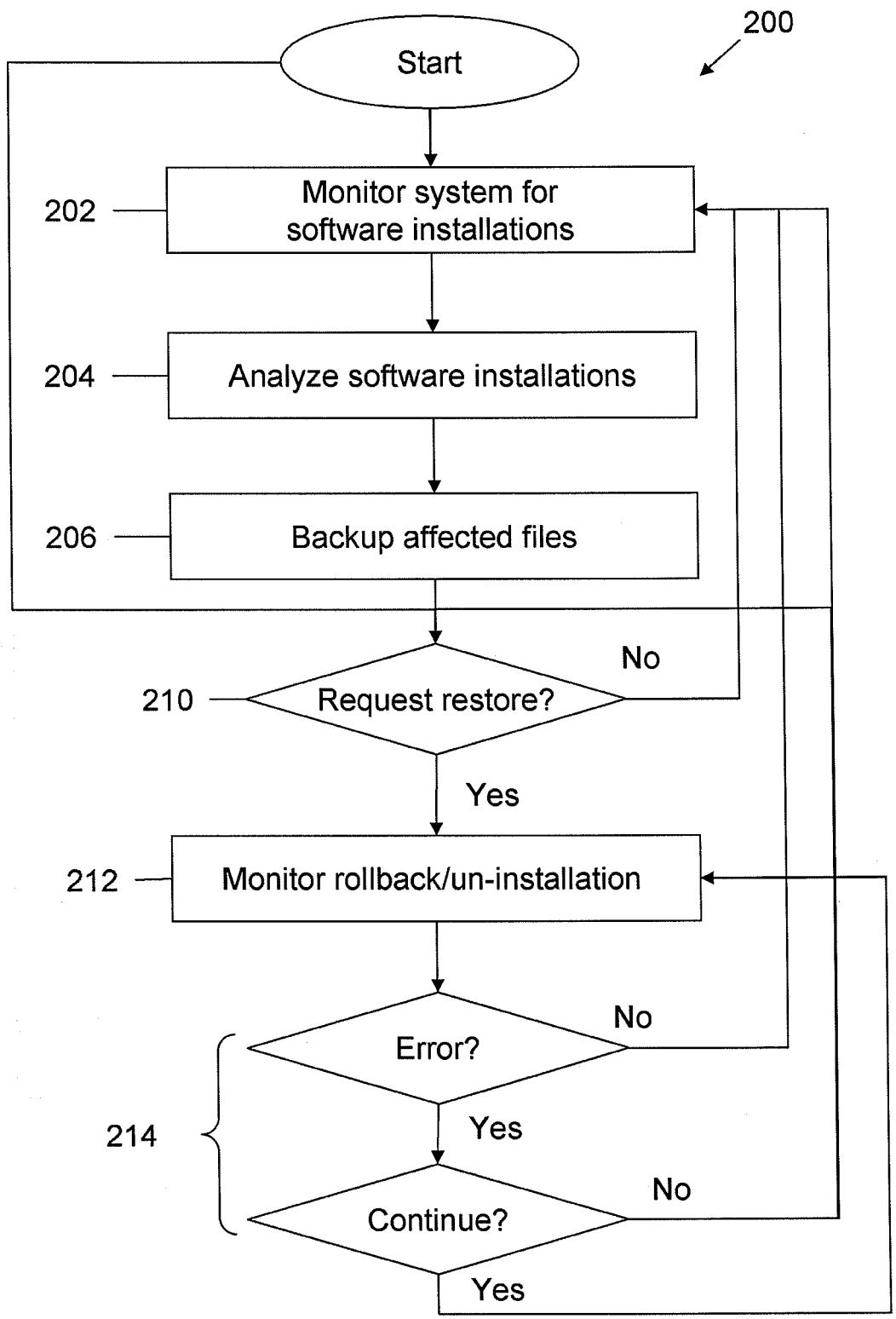
FIG. 2 is a flowchart illustrating one embodiment of a method of point in time rollback and un-installation.
Figure 3:
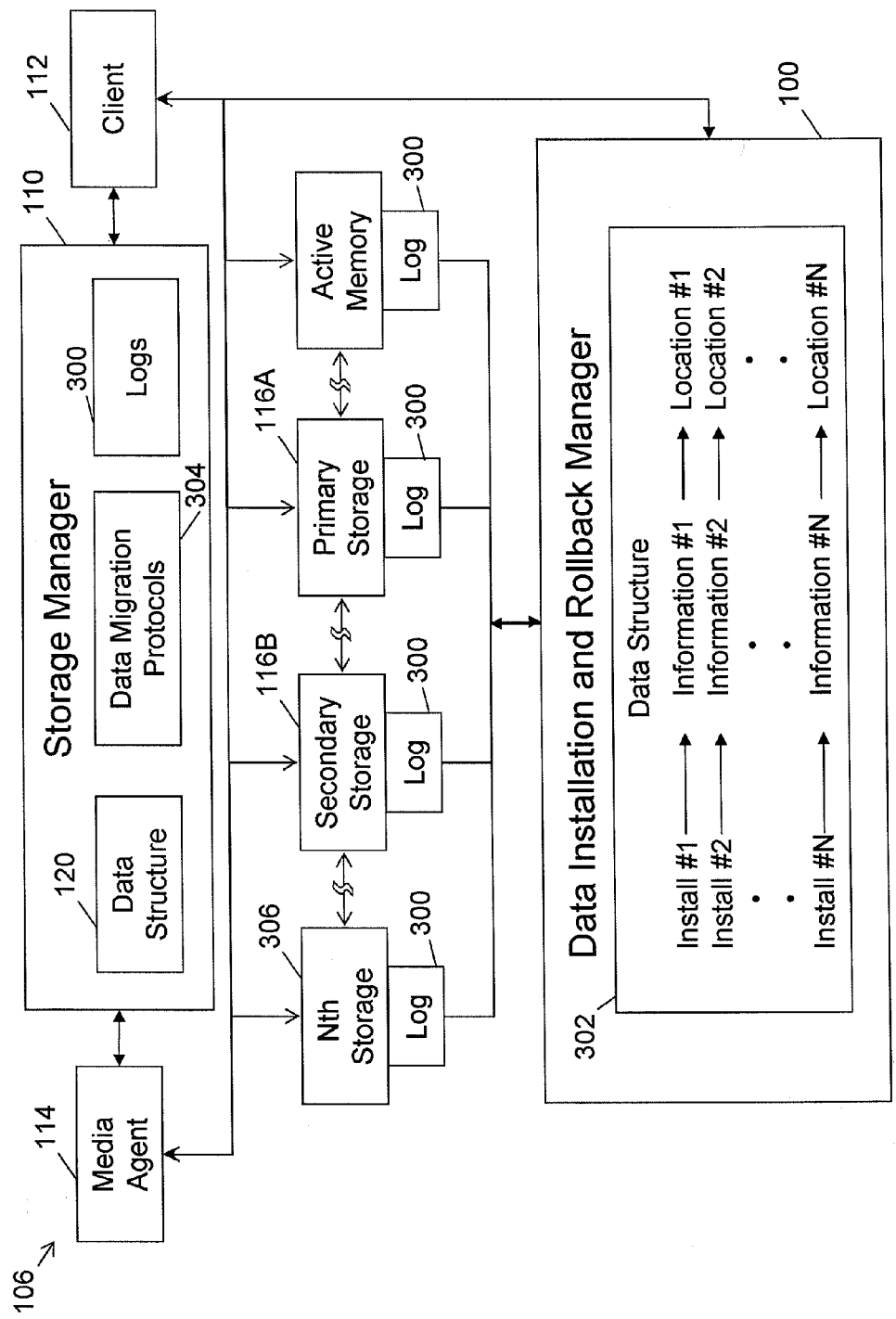
FIG. 3 is a block diagram illustrating monitoring, detection, and recording of rollback and un-installation processes within the system of FIG. 1.

FIGS. 2-3 present diagrams illustrating one embodiment of a method 200 of rollback and un-installation of software upgrades (FIG. 2) and the interaction of the rollback and un-installation manager 100 with a storage operation cell 106 (FIG. 3). In a first step 202, the rollback manager 100 monitors a plurality of cells 106 for the installation of software upgrades. In a second step 204, the rollback manager 100 performs an analysis of the installation of the upgrade to determine which files are affected by the software upgrade. In a third step 206, the rollback and un-installation manager 100 instructs data migration system 102 to create a copy of the affected files. In a fourth step 210, the rollback and un-installation manager responds to requests for removal of software upgrades. In a fifth step 212, the manager 100 monitors the rollback or un-installation process to detect errors which occur in the process.

In the first step 202 of the method 200, the manager 100 monitors the data migration system 102 and computer network in order to detect the installation of software upgrades. In one embodiment, the manager 100 may be provided with logic or other programming which allows identification of program installations. For example, the manager 100 may possess a data structure 302, such as a database, which in one aspect maintains a listing of generally known software upgrades or characteristics of upgrades which may be detected to determine that an installation has been initiated.

In one embodiment, the information stored within the data structure 302 may be written in the TAB format, as understood in the art. Briefly, the TAB file format is designed to store numeric data sets in a format that is easy for humans to read, write, and edit. TAB files can store multiple scalar, vector (1-D), and matrix (2-D) data quantities, and can make explicit the relationship between different variables. For example, the TAB files may comprise table records containing multiple columns of data, where each column is a single variable. For example, a first variable may comprise an installation name and subsequent variables may comprise parameters such as a file name, location, size, version, and date of creation or modification, as well as executables which reference the file.

In a second step 204 of the method 200, detected software installations are analyzed prior to the installation taking place. This analysis is performed to identify and record the files affected by the installation, allowing stored copies of the affected files to be created. Thus, a record of the state of the system 102 or computer network, prior to installation of an upgrade, is generated.

Files affected by the installation process may comprise any file which is written, deleted, amended, or moved during the installation process or any file which depends on a file which is so affected. Examples of such rollback files may include, but are not limited to, executable files, application files, data files, graphics files, configuration files, binary files, device drivers, backup files, archive files, text files, media files, archive files, temporary files, and dynamic link library files. These files may be referred to subsequently as rollback files.

In one embodiment, the analysis operation obtains information on the rollback files. This information may include, but is not limited to, filename, size, creation date, version, location, and reference count of affected files. This information is stored in the data structure 202 of the rollback and un-installation manager 100 for later use during the rollback and un-installation of the installations.

Information on the rollback files may be obtained in a variety of different ways. In one embodiment, a data structure 202 containing the information may be provided to the rollback and un-installation manager 100 with a software installation. For example, the installation may contain database files which may be read by the rollback and un-installation manager 100. In another aspect, an existing data structure 202 possessed by the rollback and un-installation manager 100 may be updated by databases or other data structures provided by the software installation. Advantageously, the ability to update the data structure 202 allows the rollback manager 100 to be updated without recoding the rollback manager 100, expanding the utility of the rollback manager 100 at minimal difficulty and cost.

In another embodiment, rollback files may be determined by interception and examination of commands issued by a detected software installation. The intercepted commands are examined by the rollback and un-installation manager 100, prior to execution, in order to determine the rollback files. This allows the rollback and installation manager 200 to create or update the data structure 202 appropriate to the installation. In certain embodiments, the interception and examination operations may be performed sequentially or in batch. In one aspect, during sequential operations, the rollback and un-installation manager 100 may intercept a command, examine the command, create an entry within the data structure 202 regarding the rollback files, make copies of the rollback files, then allow the command to be executed. Alternatively, in batch operations, the rollback manager 100 may intercept and examine each command, create entries within the data structure 202 pertaining to the rollback files, copy the rollback files, then allow the commands to be executed. In a further embodiment, the rollback and un-installation manager may intercept and examine each command issued by an installation, create copies of all files within the directories containing the rollback files, then allow the commands to be executed.

In the third step 206 of the method, copies of the rollback files are created in order to restore these files in the event of removal or rollback of a program installation. The rollback manager 100 communicates with the storage manager 110 to perform a plurality of data migration operations to generate copies of the rollback files, as discussed above. Following the data migration operations, the system returns to monitoring the system 102 and computer network for software installations in step 202. In one embodiment, an update history file may be generated, which keeps track of the update installation history. Such a file may comprise an xml file which contains information such as the name of the installation, date of installation, and version of the installation.

The rollback manager 100 may further provide the storage manager 110 with data migration protocols 304 dictating storage of the rollback files. In general, data migration protocols 304 are maintained by the storage manager 110 to specify data migration parameters, such as when to perform data migration operations, which data is to be migrated, where the data is to be migrated, and how long data will be retained before deletion. For example, a protocol 304 provided by the rollback manager 100 may specify that copies of the rollback files are to be retained in primary storage for a selected number of weeks from their creation before migration to secondary storage, retained in secondary storage for a selected number of months before migrating to lower level storage 306, and retained in lower level storage for a selected number of years, at which point the rollback files are deleted. The data structure 120 of the storage manager 110 maintains a record of the media agent 114 which is responsible for tracking the location of the copies of the affected files. At each stage in the data migration process, the elements may also generate logs 300 or log entries which maintain a record of the data migration and retrieval operations they perform.

Advantageously, data migration protocols 304 provided by the rollback manager 100 to the storage manager 110 provide an administrator of the system and computer network control over the installations which can be rolled back or un-installed. For example, the administrator may specify a protocol 304 in which rollback files for a selected rollback or un-installation be stored in memory or other fast storage. This may be appropriate when testing an installation, where there is an expectation that rollback may be performed soon after installation. In another example, the administrator may specify a protocol 304 in which files affected by an installation are deleted after a predetermined amount of time, expiring the rollback of that particular installation. This expiration may be appropriate under circumstances where old installations become quickly obsolete and, therefore unnecessary to save beyond a certain time window. Alternatively, protocols 304 may be provided which delete copies of rollback files after a designated number of upgrades have been installed. For example, if upgrades 4, 5, and 6 of a software application are known to run successfully, then when upgrade 7 is installed, affected files necessary for rollback of installation 4 may be deleted, as installations 5 and 6 are known to be good. Subsequently, when the copies of the rollback files are deleted, the data structure 302 may be updated by the rollback manager 100 so as to maintain the accuracy of the data structure 302. Advantageously, expiration allows the administrator to control the degree to which installations are recoverable as well as manage the costs associated with maintaining that recoverability.

In a fourth step of the method, 210, a request is made to rollback or un-install a software installation. As discussed in greater detail below with respect to FIG. 4, users and administrators of the data migration system and computer network may provide such requests through an interface of the rollback manager 100. To fulfill the request, the rollback manager 100 consults the data structure 302 to determine the rollbacks which are available to the user or administrator. Subsequently, the rollback manager 100 issues commands to the storage manager 110 to perform data migration operations necessary to perform the rollback or un-installation operations.

During the rollback or un-installation process, in a fifth step 212 of the method 200, the rollback manager 100 monitors the data migration process to ensure that the process is properly performed. In one embodiment, the rollback manager 100 compares the relevant rollback file information contained within the data structure 202 to the files which are migrated by the data migration system. For example, the rollback manager 100 may compare the filename and location of migrated rollback files to those contained within the data structure 202. In further embodiments, checksum patch counting, as known in the art, may be performed to protect the integrity of data by detecting errors in data restored. The basic components of a message, such as the bits, are added up and compared to a stored value, such as that in the tab file generated during initial installation. Provided that the sums match, it is presumed that there is a high likelihood that the data is not corrupted.

In the event that the rollback manager 100 detects an error in the rollback process, the user or administrator may be prompted with an error message 214. The error message may include, but is not limited to, any combination of a description of the error, an error code, and instructions. The error message may further comprise action prompts. In one aspect, an action prompt may allow the user or administrator to continue the rollback or un-installation operation, despite the error, returning to step 212. In another aspect, the action prompt may allow the user or administrator to cancel the process and the method 200 returns to the monitoring operation of step 202. In a further aspect, the action prompt may allow the user to select a new rollback or un-installation operation to perform, returning the method to the restoration request, step 210.

In another aspect of the rollback and un-installation operation, step 212, the rollback and un-installation manager 100 may employ reference counting to prevent the deletion of shared files or retention of orphan files. Often, certain files are shared amongst more than one application. While this sharing advantageously reduces the duplication of unnecessary files, it also complicates rollback operations. For example, it is undesirable to strictly delete all files associated with one installation if certain of those files are shared, as this may result in errors within the remaining applications which share the file. On the other hand, it is also undesirable to maintain unnecessary files, as they can degrade system performance. Thus, shared files create ambiguity as to which files may truly be deleted during a rollback or un-installation process.

Reference counting is a technique of storing the number of references, pointers, or handles to a resource such as a file. For example, such a reference count may be stored by the rollback manager 100 within the data structure 202, where each rollback file is associated with a count of the number of references to it held by other objects. If a rollback file's reference count reaches zero, the rollback file becomes unnecessary and can be deleted. In this case, the rollback manager 100 may instruct the storage monitor to delete the file. Alternatively, if a rollback file possesses a non-zero reference count, even though the rollback file is included in a listing of files associated with an installation to be rolled back or un-installed, the rollback manager 100 may instruct the storage manager 110 to retain the rollback file.

Advantageously, using reference counting, files are deleted as soon as they can no longer be referenced. In one aspect, the deletion is performed in an incremental fashion, without long pauses for collection cycles. Furthermore, the reference count provides a clearly defined lifetime of every file. In real-time applications or systems with limited memory, this is important to maintain responsiveness. This allows the rollback and un-installation manager 100 to determine when and when not to delete a file that is potentially shared.

Figure 4:
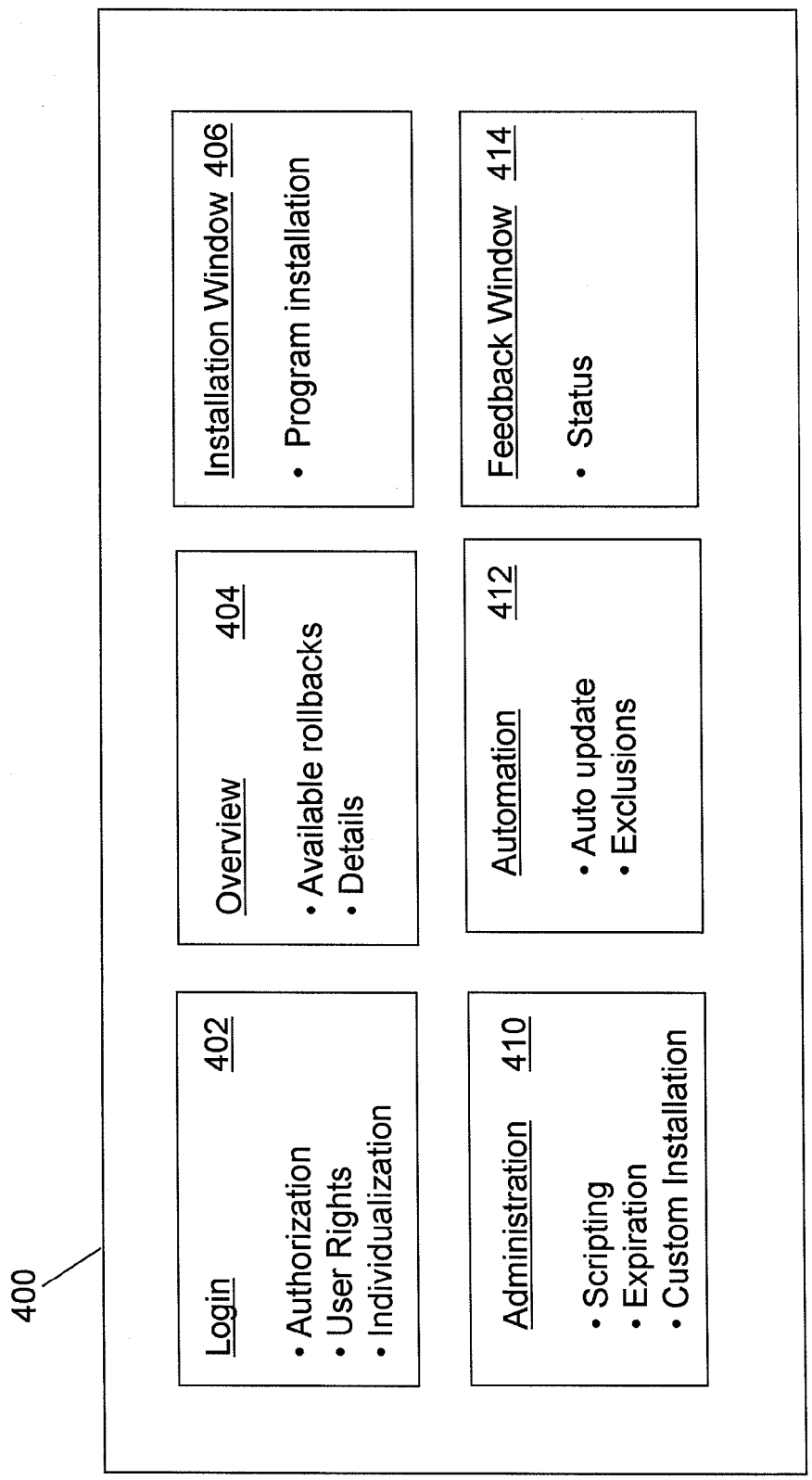
FIG. 4 is a schematic illustration of one embodiment of a graphical user interface for use in providing commands and examining the status of point in time rollback and un-installation operations.

FIG. 4 illustrates one schematic embodiment of a graphical user interface 400 of the rollback manager which allows an administrator or user of the data migration system or computer network to rollback or un-install various software installed within the data migration system or computer network. In general, the interface 400 allows the users control and limited customization over the over the rollbacks and un-installations are available to them, while allowing administrators control over the availability of the rollbacks and un-installations.

In one embodiment, the interface 400 may include tabbed windows, dividing the interface into broad sections. Advantageously, this interface 400 enhances the ease with which the administrator and users may monitor and customize the rollback operations. In a non-limiting embodiment, the sections, discussed in greater detail below, may comprise: a login window 402, an overview window 404, an installation window 406, administration window 410, an automation window 412, and a feedback window 414.

The login window 402 provides users and administrators an interface with which to establish their access privilege. In one aspect, the login window may prompt the user for a username and password. Following verification of the login information, the user or administrator may subsequently utilize the features of the rollback manager. Advantageously, the login feature allows administrators of the system to perform an array of sophisticated rollback and un-installation operations and control which operations are available to users. Advantageously, these logging levels allow professionals which maintain the system the full range of tools necessary to perform and customize rollback and un-installation operations while preventing users of the system from making choices which may adversely impact themselves or others. For example, if a user attempts to perform a rollback or un-installation operation on more than one computer, such as a cluster, or a computer not associated with the user, the rollback manager may check to ensure that the user has administrative privileges. In the event that the user does not have sufficient rights to perform an installation on the cluster, the installation or removal operation will not be performed. Further examples of the operations available to users and administrators, depending on their level of access, are discussed in greater detail below.

The overview window 404 of the interface 400 allows the user or administrator to view and execute the rollbacks and un-installations to which they have access. The overview may provide a name and date of the available rollbacks and un-installations, as well as a description. The description may provide information regarding specific hardware, software, and firmware which are affected by the rollback. Administrators may further distinguish selected upgrades or un-installations for other users. For example, major upgrades such as service packs or diagnostic packs may include parenthetical descriptive language or color to highlight these rollbacks. Advantageously, the overview 404 allows the user or administrator to quickly determine the rollbacks or un-installations available to them and assess their importance, without laborious analysis of computer files, histories, or other reports.

Installed upgrades may be rolled back or un-installed through the overview window 404. In one embodiment, the user or administrator may select to rollback one or more versions of an application or to remove an entire software application. This option is advantageous when encountering problems if the software upgrade causing the problems is known. Alternatively, the user or administrator may select a specific date and time to roll back to. This option is advantageous when encountering problems when the software upgrade causing the problems is not known. In this case, any software installed after the specified date and time is removed, subject to administrative restrictions, as discussed below.

In one aspect, an alias name may be created for each rollback or un-installation. The alias is a name which may be different from the actual name of the installation. While this alias is used for display purposes, the internal actions of the rollback manager and data migration system are actually performed upon a patch number which serves as a unique identifier. The alias name may be displayed upon installation and un-installation status screens, rollback selections, and reports. Advantageously, this allows the user or administrator the ability to name rollbacks and un-installation with names that are meaningful for them, increasing the likelihood that they will recall the rollback or un-installation.

In one embodiment, the available updates may be restricted by the logging level. For example, a user may be restricted to rollbacks which have been selected by administrators, while administrators may be able to select from any available rollback. Further logging levels may establish different levels of user or administrators, each of which possesses different access privileges. For instance, a user may only have access to rollback of a full service pack, labeled SP, while an administrator may be able to select either the full SP or variations of the SP having some patches added or removed, designated SPa, SPb, etc.

The rollback manager may also possess programming or other logic to prevent undesirable rollbacks or un-installations. As discussed above, software applications often depend on many files, some of which are shared between applications. This is particularly the case with the various updates of a single application. Thus, in one aspect, the rollback manager may require that rollback be performed sequentially. For example, if versions 1-4 of an application are stored for rollback, the user may be allowed to select rollback of version 3 only if version 4 is also selected for rollback. It may be understood, however, that with administrative privileges, such program logic may be overridden at the administrators discretion.

The administration window 410 provides an interface which users may access. Typically, the selections presented in the administrative window are those which affect a large number of users or are options of a sophisticated nature which should only be accessed by those who have the responsibility and knowledge necessary for maintaining the data migration system or computer network. For example, the administration window 410 may allow the administrator to select what rollbacks and un-installations are available to users.

In one embodiment, expiration dates for rollbacks may be selected by an administrator through the administration window 410. In one aspect, the administrator may select a time period from initial creation after which rollbacks may expire automatically. Alternatively, the administrator may manually select that the rollbacks expire immediately. In one aspect, expiration may comprise deletion of the files necessary to perform a rollback. In other aspects, expiration may result in archival storage of the files necessary for rollback. In another aspect, expiration may cause the rollbacks to become inaccessible to non-administrative users but accessible to administrators. In the case of multi-platform rollbacks, in one embodiment, the timing of a rollback may be made with reference to the installation time of the most recent installation. For each update selected for expiration, the IRM also analyzes the selection. The rollback manager may determine which updates depend on or are obviated by the selection and, if allowed by the administrator, also expire all updates which depend on the rollback as well as those it obviates.

In another embodiment, the administration window 410 of the rollback manager 100 may allow an administrator to create and distribute variations of standard service packs. In general, a service pack is a single, large patch containing binaries of all the patches, which cannot be individually uninstalled. Unfortunately, this rigidity does not allow the administrator of the system or computer network to tailor the service pack to their needs. Through the administration window 410, however, the administrator may customize the service pack distribution. The data structure associated with the service pack may be reviewed to examine the files contained within the service pack, then revised. For example, the service pack may be split into smaller units. Alternatively, files may be added or removed from the service pack. As discussed above, each service pack may be given it's own, unique name, such as SP1 for the full service pack, and names such as SP1a and SP1b for smaller divisions or revisions of the full service pack. The modified service pack may then be added to the rollback and un-installation list, allowing users to remove a portion of the service pack without removing the entire service pack. Advantageously, this tailoring allows the administrator to keep the best functioning or most relevant components of the service pack while dispensing with the worst functioning or least relevant components of the service pack.

In a further embodiment, the administration window may allow the administrator access to a command line prompt for providing instructions to the rollback manager. For example, command line options such as "-undo" may be provided where a user may specify a selected number of update levels to be removed. By default the undo level may be assumed to be 1. In one aspect, command line access may be restricted to administrators.

In yet another example, the rollback can occur automatically in response to a user input that identifies the desired pre-update state. In an additional embodiment, the administration window 410 may allow administrators to create and execute scripts. In general, scripts are a series of commands which are typically used to connect diverse, pre-existing components to accomplish a new related task. Scripts are often used to execute a series of commands that might otherwise have to be entered interactively through keyboard at the command prompt.

The automation window 412 provides the user or administrator with the ability to automate certain installation and rollback functions without human input. For example, the administrator may specify that all rollbacks be performed at a certain time of day, such as after working hours so as not to impact users during the work day.

The feedback window 414 provides the user with a display of the actions taken by the rollback and un-installation manager. In one embodiment, messages to the user or administrator may be displayed in the feedback window 414. In further embodiments, the feedback window 414 may display services which are started or stopped and information on rollback files which are migrated. In one aspect, a background thread manages operations such as copying the updates and notifying the UI thread of the changes. This information may be of use to both users and administrators. For example, a user may wish to determine if a rollback has started or stopped. Alternatively, an administrator may wish to visually confirm that a rollback operation is being performed correctly. Optionally, this display may be turned off, allowing "silent" installation and scripting.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of updating a data storage system such that the updated data storage system can be rolled back to a pre-update state, the method comprising:

automatically detecting one or more software upgrades, sequentially intercepting update commands associated with each software upgrade and identifying at least some components and files in primary storage of a data storage system that are to be updated;

delaying execution of the update commands associated with identified components and files;

automatically copying with one or more computer processors at least one or more of the identified components in the data storage system as well as at least one or more of the identified files in the data storage system existing at a pre-update state to create copied components and files prior to execution of the update commands that update the identified components and files in the data storage system such that at least some of the updated components and files can be rolled back to the pre-update state;

storing information in a rollback data structure about the copied components and files existing at the pre-update state, the rollback data structure comprising at least storage locations and copy times associated with the copied components and files existing at the pre-update state, the rollback data structure stored in the primary storage of the data storage system;

allowing execution of each update command after automatically copying the identified components and files existing at the pre-update state;

maintaining data migration parameters regarding copies of the components and files existing at the pre-update state, wherein the data migration parameters define a time period for retaining the copies of the components and files existing at the pre-update state in primary storage before migrating to secondary storage;

when migrating the copied files and components to secondary memory, updating the storage locations in the rollback data structure to identify secondary storage locations in secondary memory;

receiving a point-in-time request due to problems encountered in association with an upgrade, to roll back the one or more software updates to a point in time, to the pre-update state existing at a prior time and date;

automatically identifying which of the one or more software upgrades occurred after the point in time based at least in part on the copy times in the rollback data structure;

automatically rolling back the one or more software upgrades to the prior time and date that wherein automatically rolling back the one or more software upgrades restores the identified components and files existing at the pre-update state associated with the point-in-time request, wherein the data migration parameters further define automatic deletion of migrated copies of the components and files existing at the pre-update state after a designated number of upgrades are known to be good.

2. The method of claim 1, wherein the components comprise at least one of executable files, application files, data files, graphics files, configuration files, binary files, device drivers, backup files, archive files, text files, media files, archive files, temporary files, and dynamic link library files.

3. The method of claim 1, further comprising copying at least some components prior to performing a second update such that the components can be rolled back to a state that predates either the second update or the first update.

4. The method of claim 1, wherein the components that are to be updated are identified by examining the received update prior to performing the update.

5. The method of claim 4, wherein the components to be updated are contained within a data structure provided by the received update.

6. A system for point in time rollback and un-installation of updates within a data storage system, comprising:
- a plurality of elements which perform at least data storage operations; and
- a rollback and un-installation manager comprising computer hardware, the rollback and un-installation manager configured to:
  - automatically detect one or more software upgrades;
  - sequentially intercept update commands associated with each software upgrade and identify components and files in primary storage of a data storage system that are to be updated;
  - delay execution of the update commands associated with identified components and files;
  - automatically copy at least one or more of the identified components and files existing at a pre-update state to create copied components and files prior to execution of the update commands such that at least some of the updated components and files can be rolled back to the pre-update state;
  - store information in a rollback data structure about the copied components and files existing at the pre-update state, the rollback data structure comprising at least storage locations and copy times associated with the copied components and files existing at the pre-update state, the rollback data structure stored in the primary storage of the data storage system;
  - allow execution of each update command after automatically copying the identified components and files existing at the pre-update state;
- a data migration system comprising computer hardware, the data migration system configured to:
  - maintain data migration parameters regarding copies of the components and files existing at a pre-update state, wherein the data migration parameters define a time period for retaining the copies of the components and files existing at the pre-update state in primary storage before migrating to secondary storage;
  - when migrating the copied files and components to secondary memory, update the storage locations in the rollback data structure to identify secondary storage locations in secondary memory;
- wherein in response to a point-in-time request due to problems encountered in association with an upgrade, to roll back the one or more software updates to a point in time, to the pre-update state existing at a prior time and date, the rollback and un-installation manager is further configured to:
  - automatically identify which of the one or more software upgrades occurred after the point in time based at least in part on the copy times in the rollback data structure;
  - automatic roll back of the one or more software upgrades to the prior time and date wherein the automatic roll back of the one or more software upgrades restores the identified components and files existing at the pre-update state associated with the point-in-time request,
- wherein the data migration parameters further define automatic deletion of migrated copies of the components and files existing at the pre-update state after a designated number of upgrades are known to be good.

7. The system of claim 6, further comprising at least one of a storage manager, media agent, client computer, and storage media.

8. The system of claim 6, wherein the components comprise at least one of executable files, application files, data files, graphics files, configuration files, binary files, device drivers, backup files, archive files, text files, media files, archive files, temporary files, and dynamic link library files.

9. The system of claim 6, wherein the components that are to be updated are identified by examining the received update prior to performing the update.

10. The system of claim 9, wherein the components to be updated are contained within a data structure provided by the received update.

11. The system of claim 9, wherein the components comprise at least one of a storage manager, media agent, client computer, and storage media.

12. The system of claim 9, wherein the components comprise at least one of executable files, application files, data files, graphics files, configuration files, binary files, device drivers, backup files, archive files, text files, media files, archive files, temporary files, and dynamic link library files.

13. A rollback and un-installation system comprising:
- means for automatically detecting one or more software upgrades;
- means for sequentially intercepting update commands associated with each software upgrade and identifying at least some components and files in a data storage system that are to be updated;
- means for delaying execution of the update commands associated with identified components and files;
- means for automatically copying with one or more computer processors at least some of the identified components and files of the software application and copying at least some of the identified components and files existing at the pre-update state to create copied components and files prior to execution of the update commands that update the identified components and files in the data storage system such that at least some of the updated components and files can be rolled back to the pre-update state;
- means for storing information in a rollback data structure about the copied components and files existing at the pre-update state, the rollback data structure comprising at least storage locations and copy times associated with the copied components and files existing at the pre-update state, the rollback data structure stored in the primary storage of the data storage system;
- means for allowing execution of each update command after automatically copying the identified components and files existing at the pre-update state;
- means for maintaining data migration parameters regarding copies of the components and files existing at the pre-update state, wherein the data migration parameters define a time period for retaining the copies of the components and files existing at the pre-update state in primary storage before migrating to secondary storage; and
- when migrating the copied files and components to secondary memory, means for updating the storage locations in the rollback data structure to identify secondary storage locations in secondary memory;
- means for receiving a point-in-time request due to problems encountered in association with an upgrade, to roll back the one or more software updates to a point in time, to the pre-update state existing at a prior time and date;
- means for automatically identifying which of the one or more software upgrades occurred after the point in time based at least in part on the copy times in the rollback data structure;

means for automatically rolling back the one or more software upgrades to the prior time and date wherein automatically rolling back the one or more software upgrades restores the identified components and files existing at the pre-update state associated with the point-in-time request, wherein the data migration parameters further define automatic deletion of migrated copies of the components and files existing at the pre-update state after a designated number of upgrades are known to be good.

* * * * *

UNITED STATES PATENT AND TRADEMARK OFFICE
CERTIFICATE OF CORRECTION

PATENT NO. : 8,719,809 B2
APPLICATION NO. : 11/615378
DATED : May 6, 2014
INVENTOR(S) : Parag Gokhale Page 1 of 1

It is certified that error appears in the above-identified patent and that said Letters Patent is hereby corrected as shown below:

In the Specification

In column 8, line 4, after "media files," please delete "archive files,".

In the Claims

In column 14, line 60, in Claim 2, after "media files," please delete "archive files,".

In column 16, line 5, in Claim 8, after "media files," please delete "archive files,".

In column 16, line 20, in Claim 12, after "media files," please delete "archive files,".

Signed and Sealed this
Twenty-seventh Day of January, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,719,809 B2  
APPLICATION NO. : 11/615378  
DATED : May 6, 2014  
INVENTOR(S) : Parag Gokhale Page 1 of 1

It is certified that error appears in the above-identified patent and that said Letters Patent is hereby corrected as shown below:

In the Specification

In column 5, line 36, please change "communication" to --communication.--.

Signed and Sealed this
Twenty-eighth Day of April, 2015

Michelle K. Lee
*Director of the United States Patent and Trademark Office*